US010223308B2

(12) United States Patent
Craddock et al.

(10) Patent No.: US 10,223,308 B2
(45) Date of Patent: Mar. 5, 2019

(54) MANAGEMENT OF DATA TRANSACTION FROM I/O DEVICES

(71) Applicant: International Business Machines Corporation, Armonk, NY (US)

(72) Inventors: David F. Craddock, New Paltz, NY (US); Sascha Junghans, Ammerbuch (DE); Matthias Klein, Wappingers Falls, NY (US); Eric N. Lais, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/808,071

(22) Filed: Nov. 9, 2017

(65) Prior Publication Data

US 2018/0365182 A1 Dec. 20, 2018

Related U.S. Application Data

(63) Continuation of application No. 15/623,429, filed on Jun. 15, 2017.

(51) Int. Cl.
*G06F 13/28* (2006.01)
*G06F 13/42* (2006.01)
(Continued)

(52) U.S. Cl.
CPC .......... *G06F 13/28* (2013.01); *G06F 12/1009* (2013.01); *G06F 12/1027* (2013.01); *G06F 12/1081* (2013.01); *G06F 13/4282* (2013.01)

(58) Field of Classification Search
None
See application file for complete search history.

(56) References Cited

U.S. PATENT DOCUMENTS 5,983,301 A * 11/1999 Baker ............... G06F 13/28
710/113
6,175,889 B1 * 1/2001 Olarig .............. G06F 13/4027
370/402

(Continued)

OTHER PUBLICATIONS

David F. Craddock, et al., Pending U.S. Appl. No. 15/623,429 entitled "Management of Data Transaction From I/O Devices," filed Jun. 15, 2017.
(Continued)

*Primary Examiner* — Elias Mamo
(74) *Attorney, Agent, or Firm* — Cantor Colburn LLP; Steven Chiu (57) ABSTRACT

Embodiments include a technique for management of data transactions, where the technique includes receiving, at a link interface, a packet from an I/O device, wherein the packet includes address information, and performing, by a host bridge, an address translation for the address information included in the packet. The technique also includes responsive to performing the address translation, determining a target page associated with a translated address of the packet is for at least one of a payload target page or a signaling target page, and appending a flag to a command based at least in part on the target page being associated with the translated address of the packet. The technique includes transmitting the command to an ordering controller for ordering the packet.

6 Claims, 4 Drawing Sheets (51) Int. Cl.
*G06F 12/1081* (2016.01)
*G06F 12/1009* (2016.01)
*G06F 12/1027* (2016.01)

(56) References Cited

U.S. PATENT DOCUMENTS

| | | | | |
|---|---|---|---|---|
| 6,557,052 | B1* | 4/2003 | Kubo | G06F 13/28 |
| | | | | 710/23 |
| 6,801,970 | B2* | 10/2004 | Riley | G06F 13/423 |
| | | | | 370/402 |
| 8,108,584 | B2* | 1/2012 | Harriman | G06F 13/1626 |
| | | | | 710/313 |
| 9,792,245 | B2* | 10/2017 | Raghavan | G06F 13/28 |
| 2014/0281106 | A1* | 9/2014 | Saghi | G06F 3/0664 |
| | | | | 710/313 |

OTHER PUBLICATIONS

List of IBM Patents or Patent Applictions Treated as Related; (Appendix P), Filed Nov. 9, 2017, 2 pages.

* cited by examiner

MANAGEMENT OF DATA TRANSACTION FROM I/O DEVICES

DOMESTIC PRIORITY

This application is a continuation of U.S. patent application Ser. No. 15/623,429, filed Jun. 15, 2017, the content of which is incorporated by reference herein in its entirety.

BACKGROUND

The present invention generally relates to data management, and more specifically, to the management of data transactions from I/O devices.

I/O devices are used in computer and mainframe systems for storing and transferring data. Mainframes and computing systems can process high volumes of I/O data and are configured to simultaneously support applications and I/O devices to service thousands of users. Direct memory access (DMA) can be used by various hardware including disk drive controllers, graphics cards, network cards, sound cards, etc. of computer systems to transfer data between devices with less CPU overhead. DMA can also be used in intra-chip data transfer in multi-core processors without occupying the CPU time.

When using DMA, the CPU first initiates the transfer, and then the CPU is made available to perform other operations while the initial transfer of data into the memory is in progress. This allows the CPU to perform other useful work or priority tasks while waiting for relatively slow I/O data transfers to be completed. This is also useful at any time the CPU cannot keep up with the rate of a data transfer. As the functionality and capacity of mainframes continue to grow, the management of the data, in particular I/O data, should be efficiently processed to limit any delays experienced by the system.

SUMMARY

Embodiments of the present invention are directed to a computer-implemented method for management of data transactions from I/O devices. A non-limiting example of the computer-implemented method includes receiving, via a link interface, a packet from an I/O device, wherein the packet includes address information, and performing, via a host bridge, an address translation for the address information included in the packet. The computer-implemented method also includes responsive to performing the address translation, determining a target page associated with a translated address of the packet is for at least one of a payload target page or a signaling target page, and appending a flag to a command based at least in part on the target page being associated with the translated address of the packet. The computer implemented method includes transmitting the command to an ordering controller for ordering the packet.

Embodiments of the present invention are directed to a system for management of data transactions from I/O devices. A non-limiting example of the system includes one or more processors and at least one memory, where the memory includes instructions that are executable by at least one of the one or more processors. The one or more processors are configured to receive, via a link interface, a packet from an I/O device, wherein the packet includes address information, and perform an address translation for the address information included in the packet. The one or more processors are further configured to responsive to performing the address translation, determine a target page associated with a translated address of the packet is for at least one of a payload target page or a signaling target page, append a flag to a command based at least in part on the target page associated with the translated address of the packet. The one or more processors are configured to transmit the command to an ordering controller for processing the packet.

Embodiments of the invention are directed to a computer program product for management of data transactions, the computer program product comprising a computer readable storage medium having program instructions embodied therewith. The program instructions are executable by a processor to cause the processor to receive a packet from an I/O device, wherein the packet includes address information, and perform an address translation for the address information included in the packet. The instructions are further executable to cause the processor to responsive to performing the address translation, determine a target page associated with a translated address of the packet is for at least one of a payload target page and a signaling target page, and append a flag to a command based at least in part on the target page associated with the translated address of the packet. The instructions are further executable to cause the processor to transmit the command to an ordering controller for processing the packet.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In computer systems, microprocessors operate on data stored in the main memory. Since there are capacity limitations on the main memory, additional storage devices, such as hard disks, are provided to supplement the main memory. When the microprocessor performs an operation the data is moved from the additional memory device into the main memory. Depending on the amount of data to be processed, the transfer of data from the additional memory device to the main memory can be a very time consuming process and can further delay the processing of other critical tasks. When the microprocessor is required to manage the transfer of data, the performance of the computer system can be impacted.

In an effort to assist the microprocessors from controlling all of data transfers within a computer system between storage devices and the main memory, a direct memory access (DMA) controller can be used. The DMA controller receives information from the microprocessor indicating the location of the data to be transferred, the address associated with the destination of the data, and the number of bytes of data to transfer. After the microprocessor has been programmed, the DMA controller oversees the transfer of the memory data inside the computer system instead of the microprocessor. In one or more embodiments, DMA operations are used to move data between input/output (I/O) devices and memory.

In one scenario, DMA write requests entering the host are executed in strict order. For each DMA write operation, it can never be observed that the store has arrived before one of its predecessors. Therefore host processors are tasked with sequencing the packets of the received data stream prior to a CPU performing an action on the data. The requirement to order all payload stores can lead to a throughput degradation and latency increase (up to 50% and more), compared to an unordered execution of payload stores.

Some processes running on a processor require the full ordering of packets of a data stream prior to processing. However, as packets are either ordered when they are received or are ordered after being received, a period of time is required for performing the sequencing of the packets. In addition, the complete ordering of packets may be unnecessary as all processes do not require the complete ordering of the packets causing an ordering or sequencing controller to devote time to ordering packets that are not required to be ordered by the receiving process. For example, some processes do not require payload data to be sequenced when an interrupt signal or an indication is provided to a processor. The processor only requires that each piece of payload data is present and stored in the memory. However, in some instances, signaling information is required to be strictly ordered. When processing the signaling information, the previously received payload data can be pushed out prior to processing the signaling information.

Given the high volume of I/O data processed by mainframes, the effects of a delay can quickly accumulate and add unnecessary processing delay to the system when processing the plurality of transactions. Instead of efficiently processing data, the CPU is held waiting for data transfers to the CPU memory to be completed. In one or more examples, the delay can be attributed to the sequencing of data that does not require sequencing. The full ordering of the incoming data stream comes at a high cost in terms of latency and throughput limitations. Each piece of data that is to be written to a memory subsystem does not require a particular sequence, therefore, sequencing this particular data adds to the latency, processing delay, and reduces the bandwidth of the system.

Although I/O devices can indicate whether data requires strict sequencing, the external I/O devices along the transfer path may not be reliable as different vendors of the external devices can manage and mark the I/O data streams using different techniques. The ordering controller will then be required to have knowledge of "how" each of the external devices in the I/O path from the source to the destination device manages the data. In addition, the full ordering of a data stream increases the latency and throughput limitations of processing, potentially causing the CPU to wait an unnecessary period of time during processing as a single process is holds up the processing as data is being transferred to the memory.

Turning now to an overview of the aspects of the invention, one or more embodiments of the invention address the above-described shortcomings of the prior art by providing a technique to reliably determine which packets are associated with signaling target pages and payload target pages based on information provided in an address translation table. An operating system O/S can provide the context information for the signaling and payload data, and firmware/software can annotate an address translation table to determine whether the strict ordering is required for the data.

The described techniques perform the internal classification and generating a flag based on context information provided by a program, such as an O/S, where the program has knowledge of the locations in the memory subsystem. In a different embodiment, the program can also be a driver or an application. This is distinguished from receiving a packet that has been marked or flagged by an external device that may have processed, received, and/or forwarded the packet.

The above-described aspects of the invention address the shortcomings of the prior art by having a program running on a processor classify the I/O data of the data stream as either signaling or payload data based on the targeted page associated with the I/O data. As a result, the ordering controller can relax the ordering based on the classification to increase the CPU processing efficiency and bandwidth.

In one or more embodiments, the firmware/software allocates a page for a data transfer, where the firmware/software is aware of whether the page will contain either payload data or signaling information. In the event the page is associated with a payload operation, the firmware/software sets a payload ordering hint bit in an address translation entry of an address translation table. When the host bridge performs a fetch operation in the address translation entry, the host bridge will look at the payload ordering hint bit. In addition to performing the address translation, the host bridge will forward this hint indication for each data store into that page.

Next, an ordering controller of the PCI-Express bridge controller (PBC) can use the ordering hint bit to order the data. In the event the ordering hint bit is set, the PBC can relax the ordering for the DMA write operations resulting in the DMAs being unordered.

In the event the ordering hint bit is not set, for example signaling stores, the preceding payload stores can be pushed out of the memory. Signaling stores do not have the ordering hint bit set because signaling requires strict ordering.

The techniques described herein are focused on extending the relaxation of the ordering of I/O data by using a firmware/software specified hint bits in the I/O address translation table in contrast to the natural hardware understanding of payloads. In one or more embodiments, the hint bit is forwarded from the host bridge in a command to the ordering controller.

Conventionally, packets from I/O devices do not include any indication of whether the data is associated with signaling or payload data. However, the programs that are running on the processor have knowledge whether the data is signaling or payload data because the program will already know which memory location(s) is associated with payload and signaling information.

The techniques described herein also overcome the challenge of relying on markings from external devices to control the management of I/O data to sequence the incoming data stream and unnecessarily sequencing the packets of the data stream that do not require sequencing. Because the context information is provided internally by a program running on the processor there is no ambiguity in determining whether the I/O data targets a payload or signaling page.

Figure 1:
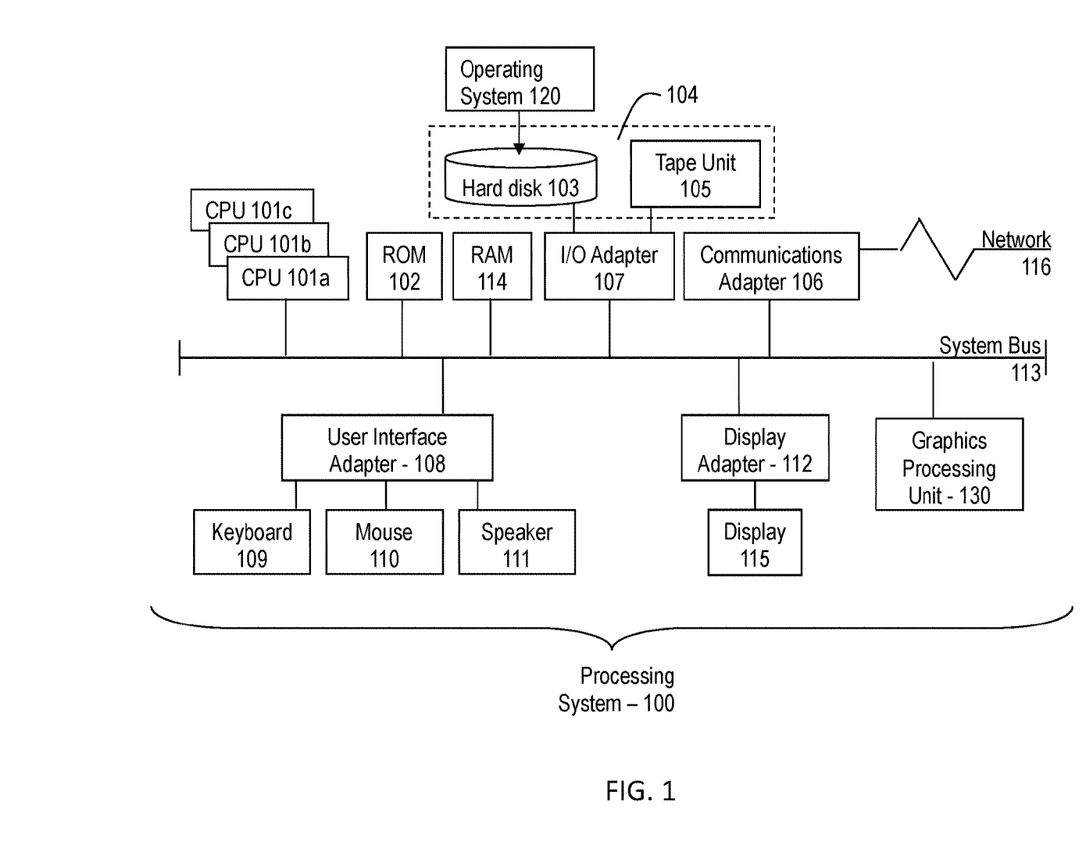
FIG. 1 depicts a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

One or more embodiments improve over the prior art by no longer having to rely on information provided in a packet received from an I/O device for ordering a data stream into memory. The bandwidth is further increased because the ordering of payload data can be relaxed, where the indication of the payload and/or non-payload data is determined by the program running on the processor which has knowledge of the memory location of the data. The program can instruct the hardware how to manage data received in a data stream.

In one or more embodiments, the processing efficiency of the CPU is increased due to the relaxed ordering of the data stream. In addition, the CPU is not being held up as data is being transferred into the memory subsystem from the I/O subsystem. The reliability is increased due to the internal classification of packets that are associated with signaling and payload data.

Figure 2:
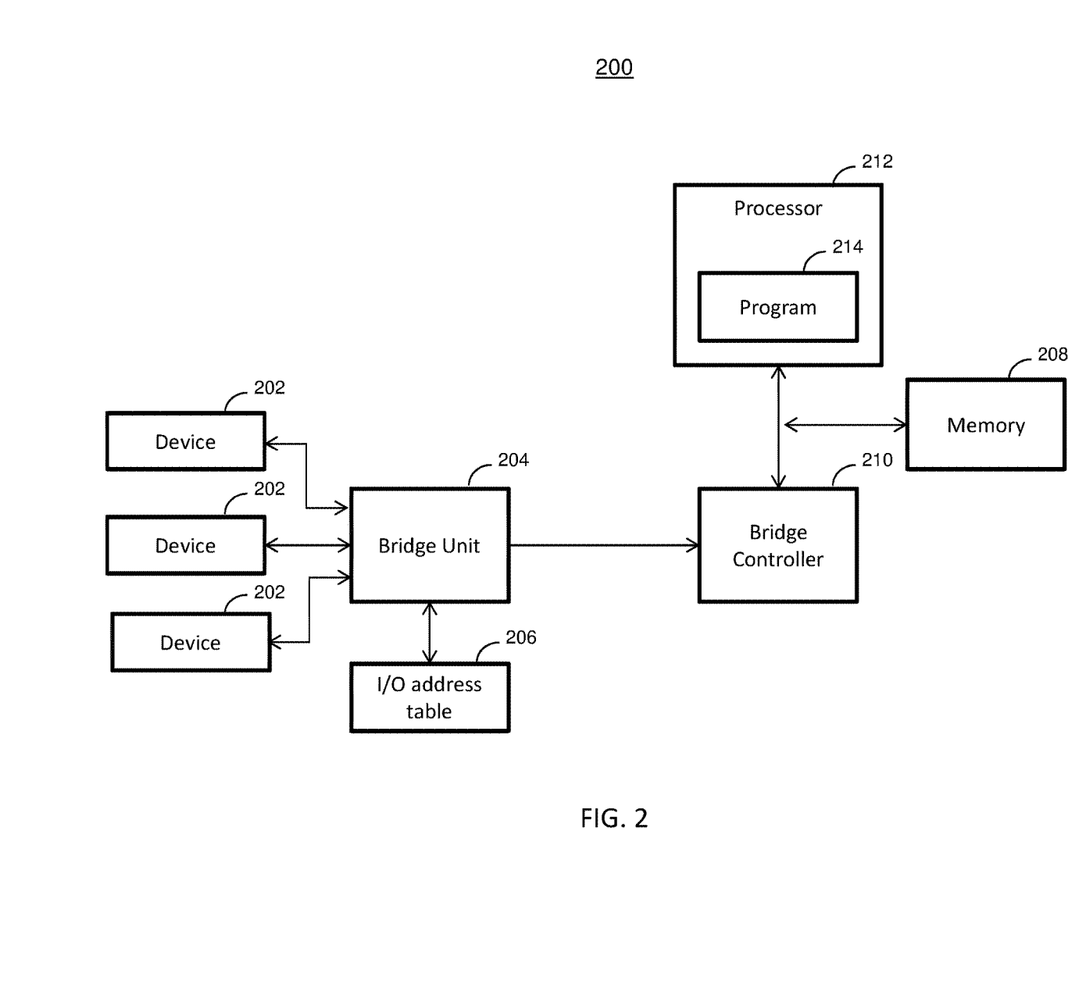
FIG. 2 depicts block diagram of a system in accordance with an embodiment for management of data transactions from I/O devices.

Now referring to FIG. 2, a block diagram of a system 200 for managing of data transactions from I/O devices is shown.

The system 200 includes a plurality of devices 202 configured to transferring data either directly or over a network. In one or more embodiments, the devices 202 are peripheral component interconnect PCI-Express connected I/O devices. The bridge unit 204 can be coupled to one or more of the devices 202 that are transferring data. The bridge unit 204 is configured to send commands to the bridge controller 210 used to manage data transfers. In an embodiment, the bridge unit 204 can be a PCI-Express bridge unit (PBU). The PBU as shown is configured to perform address translation for received data of a data stream having address information. The address translation can be used to convert an external address to an address associated with a location in the memory subsystem 208. The I/O address translation logic 206 can be located in the bridge unit. Systems exist where I/O address translation logic is located in a host bridge, where the I/O translation logic serves to translate virtual I/O addresses received over the I/O bus into physical addresses in the memory subsystem. In another embodiment, the bridge unit 204 can be a host bridge (ETU) that performs the address translation for the PCI-Express address. The ETU searches the memory and determines the target page associated with the PCI-Express address of the data packet. In one or more embodiments, the target page can either be associated with a signaling page or a payload page. The ETU uses this information and passes this information to the PCI-Express bridge controller which includes an ordering controller which controls the ordering of the packets prior to transferring the packets to memory based on the information from the ETU.

In an embodiment, the bridge controller 210 is a PCI-Express bridge controller (PBC). The PBC can include an ordering controller that is configured to communicate with the bridge unit 204, processor 212, and memory subsystem 208. In one or more embodiments, processor 212 executes instructions from program 214. The PCI-Express bridge controller uses the information in the command to control the ordering of the packets to be transferred to the memory. However, when a packet that is associated with signaling information is processed, the preceding packets will be pushed out regardless of having a flag set indicating the ordering hint bit or not.

In one or more embodiments, the ordering controller is a component of the PCI-Express bridge controller (PBC) that manages the received data that is to be transferred to memory. In an embodiment, a bridge unit 204 is configured to transmit commands to an ordering controller and the ordering controller processes the data based on commands received from the bridge unit 204. In one or more embodiments, the bridge unit 204 is configured to modify the command message transmitted to the ordering controller of the PBC by appending a flag indicating whether a received packet is associated with signaling or payload data. Responsive to receiving the command, the PBC can control the transfer of data based at least in part on the received command.

The bridge controller 210 as shown is coupled to the system memory 208. In one or more embodiments, the memory controller is a PCI-Express bridge controller. The ordering controller is also coupled to the processor 212. An interrupt can be generated when I/O completion operations are performed. In a different embodiment, a location in memory can be polled to look for an indication indicating the I/O data has been transferred to the memory and is ready for processing.

Figure 3:
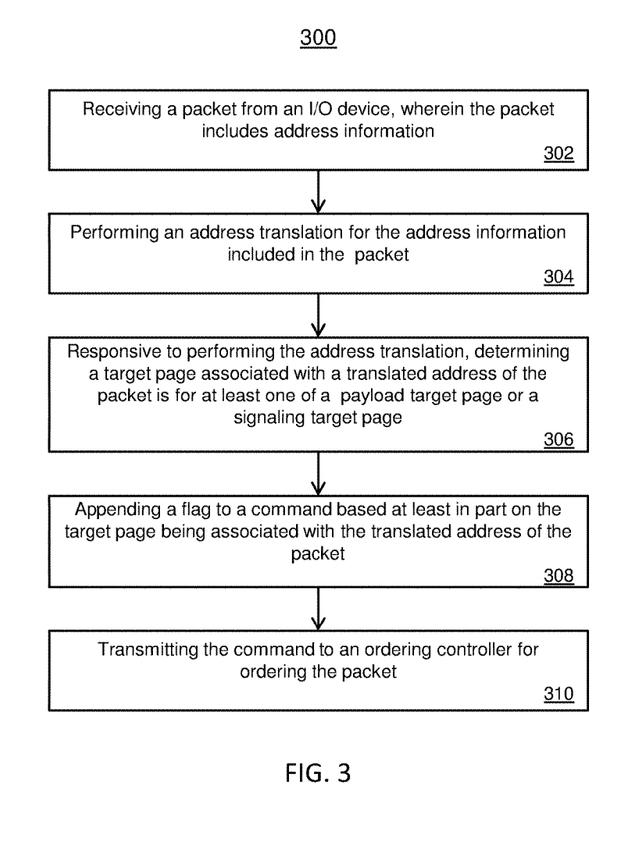
FIG. 3 depicts a flow chart of a method for management of data transactions from I/O devices in accordance with an embodiment.

Now referring to FIG. 3, a method 300 for the management of data transactions from I/O devices in accordance with an embodiment is shown.

Block 302 provides receiving, via a link interface, a packet from an I/O device, wherein the packet includes address information. The interface serves as a translator between the device and a program (O/S) on a computing device. In one or more embodiments, the link interface can be a PCI-Express interface that receives data from an I/O device. In one or more embodiments, the address information included in the packet is a PCI-Express address associated with respective PCI-Express devices.

Block 304 provides performing, via a host bridge, an address translation for the address information included in the packet. In one or more embodiments, the address information is translated to a physical address of a memory location of the memory subsystem. The PCI-Express addresses are converted because external devices may not have any knowledge of the physical addresses associated with the memory locations of the memory subsystem.

Block 306 provides responsive to performing the address translation, determining a target page associated with a translated address of the packet is for at least one of a payload target page and a signaling target page. A page is a data structure used by a computer system to store mappings between virtual addresses and physical addresses. Virtual addresses are used by the accessing process, while physical addresses are used by the hardware, or more specifically, by the RAM subsystem. As a non-limiting example, virtual addresses can include the PCI-Express addresses of the devices. In one or more embodiments, an O/S running on a processor is responsible for mapping the virtual address provided by the process to the physical address of the actual memory where the data is stored. In an embodiment, a page can be used to store signaling information while a different page can be used to store payload signaling.

Block 308 provides appending a flag to a command based at least in part on the target page associated with the translated address of the packet. In one or more embodiments, the host bridge (ETU) adds a flag to a command that is transmitted to the ordering controller (of the PBC) indicating whether the packet is required to be ordered.

Block 310 provides transmitting the command to an ordering controller. In one or more embodiments, the ordering controller is a component of the PCI-Express bridge controller and transfers the packets in accordance with the indication provided in the command.

Figure 4:
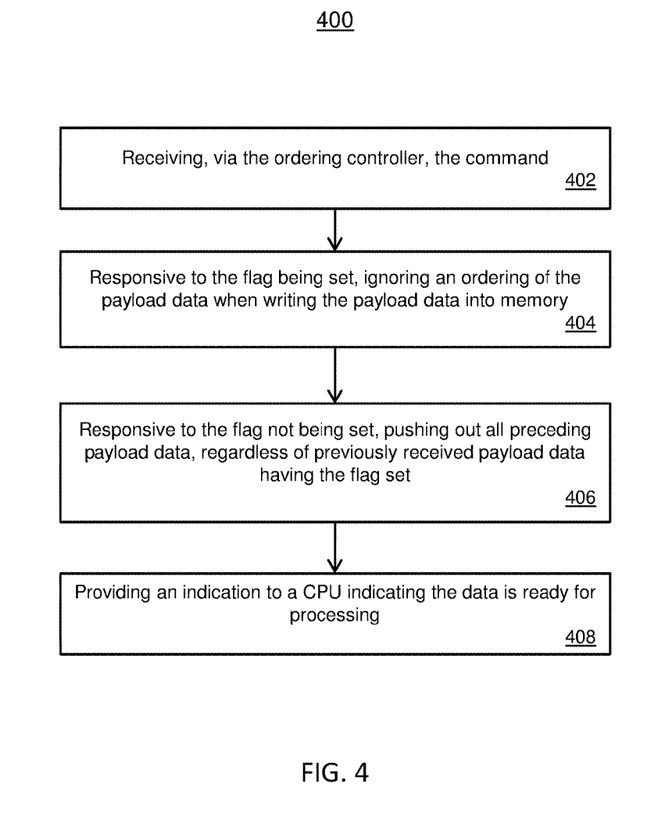
FIG. 4 depicts a flow chart of a method for management of data transactions from I/O devices in accordance with an embodiment.

Referring to FIG. 4, a different method 400 for the management of transaction I/O data is shown. Block 402 provides receiving, via the ordering controller, the command. In one or more embodiments, a PBC includes an ordering controller that controls the transfer of data to the memory.

Block 404 provides responsive to the flag being set, ignoring an ordering of the payload data when writing the payload date into memory. In one or more embodiments, the ordering of payload packets does not require a strict sequencing. The I/O data which is payload data can be transferred to the memory in any order by the controller.

Block 406 provides responsive to the flag not being set, pushing out all preceding payload data, regardless of previously received payload data having the flag set. Block 408 includes providing an indication to a CPU indicating the data is ready for processing.

The techniques described herein are focused on extending the ordering relaxation of data in an I/O data stream by using firmware/software specified hints in the I/O address translation table. In one or more embodiments, the PBC maintains an ordering matrix having a size of N×M, where N is the number of stores that can be active in the PBC at a given moment. If a bit is set in row M of column N means that the store finite state machine (FSM) N has an ordering dependency towards FSM M (meaning that N has to be ordered behind M).

In addition, the PBC maintains a table with depth N, where each bit indicates, whether FSM indicates FSM N is busy with an active ordered command. When a command is received (in I/O mode) and the unordered bit is set, neither the ordering matrix nor the active ordered command tables are updated.

When a command is received for FSM N and the unordered bit is not set for I/O, the active ordered command table is copied into column N of the ordering matrix and the bit N in the active ordered command matrix is set.

When a command M is completed, the row M in the ordering matrix is reset as well as the bit M in the active ordered command table. For coupling operations, the unordered bit can be changed in semantics to set the corresponding bit in the active ordered command table while not setting any bits in the corresponding row in the ordering matrix.

In one or more embodiments, an additional hint bit in addition to the "unordered" bit is used. The "relax ordering" bit can take the semantics of the modified "unordered" behavior for coupling traffic. The DMAs with the "relax ordering" bit will not wait for any predecessor, but subsequent DMAs that do not have the "relax ordering" bit set will be ordered behind even those with the "relax ordering" bit set. In one or more embodiments, the "relax ordering" bit is set by the host bridge (ETU) when it forwards the command to the ordering controller in the PBC.

The ETU originates this bit from the I/O address translation entry associated with a DMA. The ETU is configured to set the "relax ordering" bit based on the information of an I/O Address Translation Entry associated with the DMA. Each I/O address translation entry has a bit indicating whether the DMA should have the "relaxed ordering" bit set.

In one or more embodiments, the firmware/software will set the "relax ordering" bit for each page that is associated with a payload transfer. The firmware/software will not set the "relax ordering" bit for those pages that are targeted for signaling operations. Interrupts will push out all DMA writes, regardless of the "relax ordering" bit being set.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for management of data transactions, the method comprising:
   receiving, via a link interface, a packet from an I/O device, wherein the packet includes address information;
   performing, via a host bridge, an address translation for the address information included in the packet;
   responsive to performing the address translation, determining a target page associated with a translated address of the packet is for at least one of a payload target page or a signaling target page;
   appending a flag to a command based at least in part on the target page being associated with the translated address of the packet;
   transmitting the command to an ordering controller for ordering the packet;
   wherein the packet includes at least one of a signaling or a payload data;
   responsive to the flag being set, ignoring an ordering of the payload data when writing the payload data into memory; and
   responsive to the flag not being set, pushing out all preceding payload data, regardless of previously received payload data having the flag set.

2. The computer-implemented method of claim 1, wherein the flag is set based on an ordering hint bit of an address translation table being set by a program.

3. The computer-implemented method of claim 2, wherein the program is at least one of an operating system O/S, a driver, or an application.

4. The computer-implemented method of claim 1, wherein the link interface is a peripheral component interconnect PCI-Express link interface, wherein the address information of the packet is a PCI-Express address, and wherein the ordering controller is a PCI-Express bridge controller.

5. The computer-implemented method of claim 4, wherein the address translation converts the PCI-Express address of the packet to a memory location address of the memory.

6. The computer-implemented method of claim 1, wherein the command is a direct memory access write command.

* * * * *